United States Patent
Lee et al.

(10) Patent No.: US 10,120,386 B2
(45) Date of Patent: Nov. 6, 2018

(54) ROBOTIC CREATURE AND METHOD OF OPERATION

(71) Applicant: Robert Bosch Start-Up Platform North America, LLC, Series 1, Redwood City, CA (US)

(72) Inventors: Stephanie Lee, Redwood City, CA (US); Douglas Dooley, Redwood City (CA); Sarah Osentoski, Redwood City, CA (US); Kaijen Hsiao, Redwood City, CA (US)

(73) Assignee: Robert Bosch Start-Up Platform North America, LLC, Series 1, Redwood City, CA (US)

( * ) Notice: Subject to any disclaimer, the term of this patent is extended or adjusted under 35 U.S.C. 154(b) by 0 days.

(21) Appl. No.: 15/817,035

(22) Filed: Nov. 17, 2017

(65) Prior Publication Data
US 2018/0143645 A1    May 24, 2018

Related U.S. Application Data

(60) Provisional application No. 62/424,315, filed on Nov. 18, 2016, provisional application No. 62/424,308, filed on Nov. 18, 2016.

(51) Int. Cl.
| | | |
|---|---|---|
| G05B 19/04 | (2006.01) | |
| G05B 19/18 | (2006.01) | |
| G05D 1/02 | (2006.01) | |
| B25J 11/00 | (2006.01) | |

(52) U.S. Cl.
CPC ........ *G05D 1/0246* (2013.01); *B25J 11/0015* (2013.01); *G05D 1/0255* (2013.01); *G05D 2201/0217* (2013.01)

(58) Field of Classification Search
CPC ............... G05D 1/0246; G05D 1/0255; G05D 2201/0217; B25J 11/0015
USPC ......................................................... 700/253
See application file for complete search history.

(56) References Cited

U.S. PATENT DOCUMENTS

| | | | |
|---|---|---|---|
| 7,313,524 B1 * | 12/2007 | Minamino | ................ 704/270 |
| 8,996,429 B1 * | 3/2015 | Francis, Jr. | ............ G06N 3/008 706/12 |
| 2004/0093118 A1 * | 5/2004 | Sabe | ........................ A63H 3/28 700/245 |
| 2005/0043956 A1 * | 2/2005 | Aoyama | ................ G10L 15/22 704/276 |
| 2006/0143017 A1 * | 6/2006 | Sonoura | .................. G10L 15/26 704/275 |
| 2007/0005822 A1 * | 1/2007 | Yamamoto | .......... H04L 12/2803 710/15 |
| 2007/0150099 A1 * | 6/2007 | Lee | ........................ G06N 3/008 700/245 |
| 2007/0192910 A1 * | 8/2007 | Vu | ........................... B25J 5/007 700/245 |
| 2008/0119959 A1 * | 5/2008 | Park | ........................ G06N 3/008 700/245 |

(Continued)

*Primary Examiner* — Harry Y Oh
(74) *Attorney, Agent, or Firm* — Jeffrey Schox; Diana Lin

(57) ABSTRACT

A robotic creature system includes an actuatable head defining eyes, an eyelid mechanism, a body, a drivetrain, and a set of sensors. A method for robotic creature operation includes: detecting an event associated with a technological imperfection and automatically performing a set of expressive actions associated with the event.

15 Claims, 13 Drawing Sheets

(56) References Cited

U.S. PATENT DOCUMENTS

| | | | |
|---|---|---|---|
| 2010/0332231 A1* | 12/2010 | Nakano | G10L 15/063 |
| | | | 704/254 |
| 2015/0343633 A1* | 12/2015 | Gouaillier | G05B 13/04 |
| | | | 700/261 |
| 2015/0381132 A1* | 12/2015 | Hayashi | H03G 3/32 |
| | | | 381/107 |
| 2017/0072560 A1* | 3/2017 | Clerc | B25J 9/101 |
| 2017/0125008 A1* | 5/2017 | Maisonnier | B25J 11/003 |
| 2017/0239812 A1* | 8/2017 | Thapliya | B25J 9/163 |
| 2017/0330583 A1* | 11/2017 | Lee | G10L 15/22 |

* cited by examiner

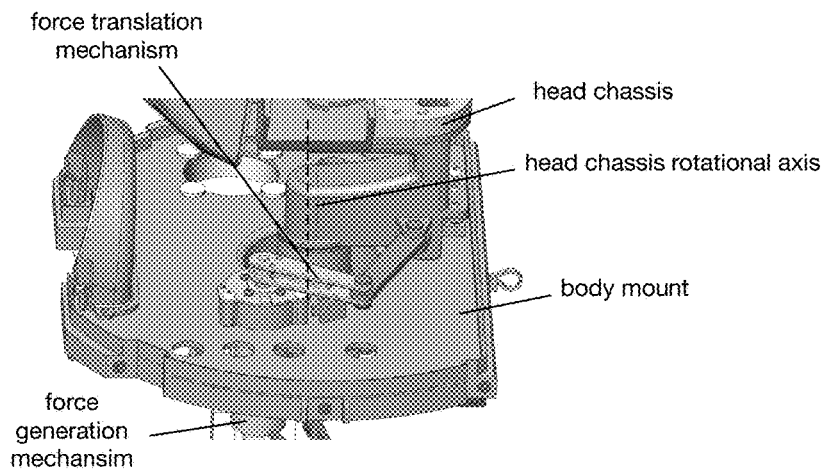
FIGURE 4
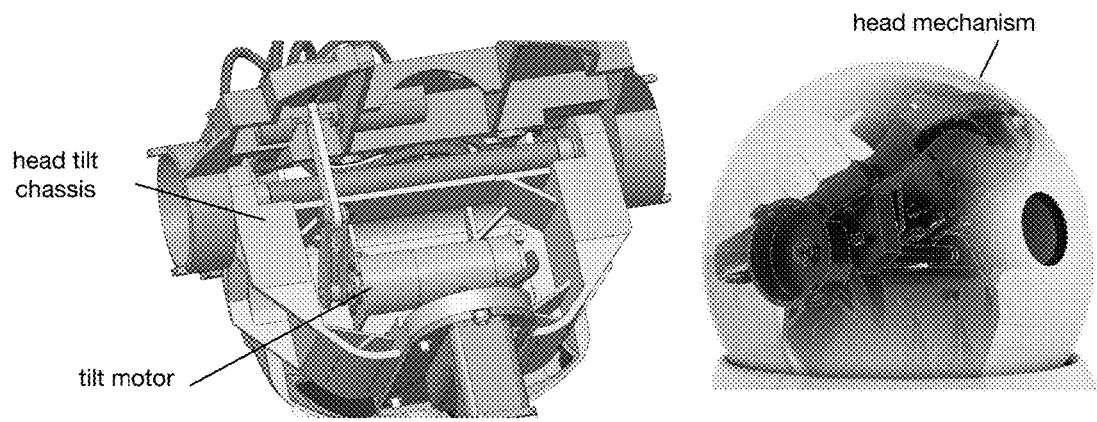
FIGURE 5A
FIGURE 5B acoustic output rangefinding system bump shell drivetrain dock

ROBOTIC CREATURE AND METHOD OF OPERATION

CROSS-REFERENCE TO RELATED APPLICATIONS

This application claims the benefit of U.S. Provisional Application No. 62/424,315, filed 18 Nov. 2016, and U.S. Provisional Application No. 62/424,308, filed 18 Nov. 2016, both of which are incorporated in their entireties by this reference.

This application is related to U.S. Ser. No. 29/587,060 filed 9 Dec. 2016, and U.S. application Ser. No. 29/587,059 filed 9 Dec. 2016, both of which are incorporated in their entireties by this reference.

TECHNICAL FIELD

This invention relates generally to the robotics field, and more specifically to a new and useful robotic creature and method of operation in the robotics field.

BRIEF DESCRIPTION OF THE FIGURES

FIG. 4 is an illustration of a variation of the head mechanism.

FIGS. 5A, 5B, and 5C are illustrations of a second and third variation of the head mechanism, respectively.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
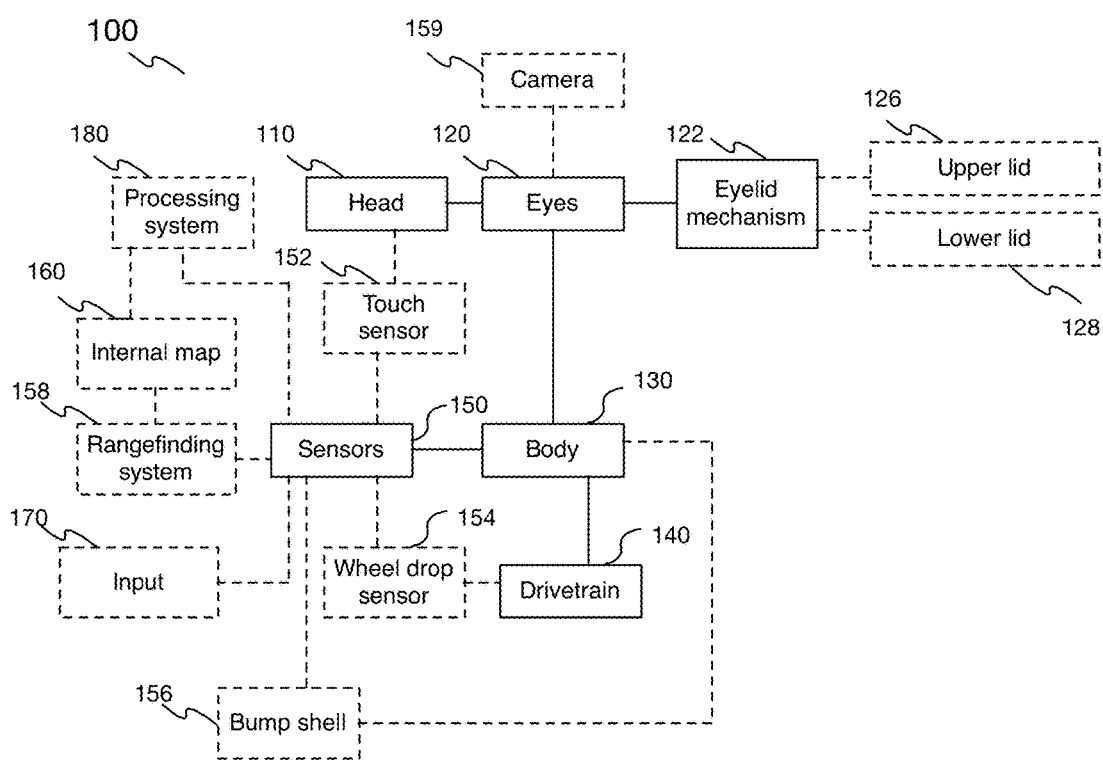
FIG. 1 is a schematic representation of a variation of the robotic creature.
Figure 2:
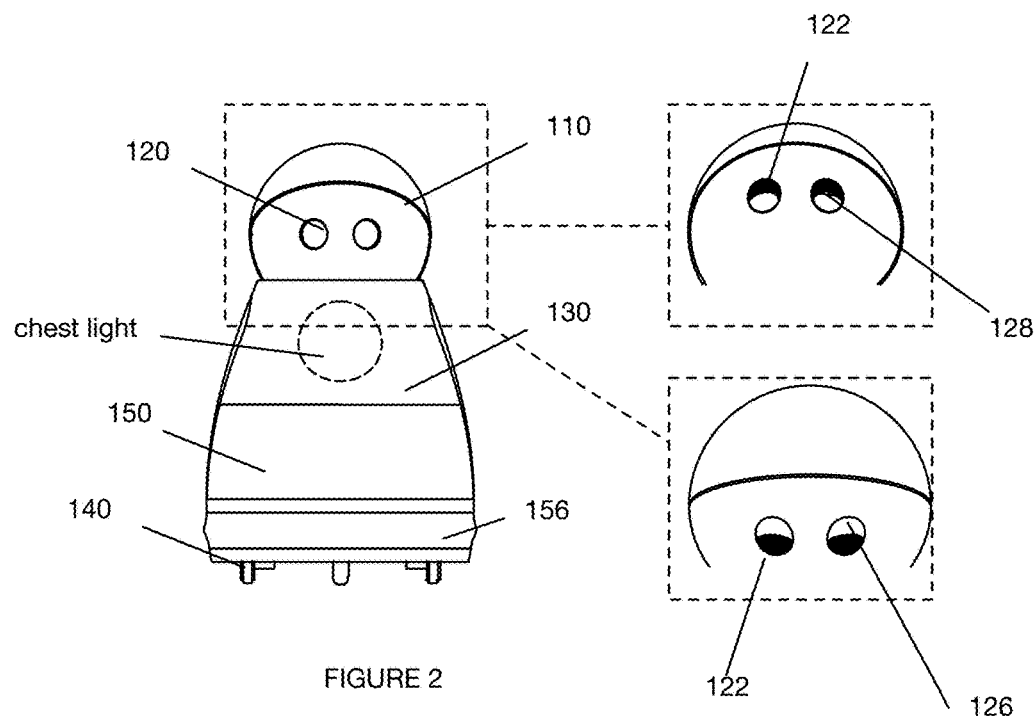
FIG. 2 is an illustration of a variation of the robotic creature.

As shown in FIG. 1, the robotic creature 100 includes: an actuatable head 110 defining eyes 120, an eyelid mechanism 122, a body 130, a drivetrain 140, and a set of sensors 150. In some variants (e.g. FIG. 2), the sensors can include: an array of touch sensors 152 arranged on the head, wheel drop sensors 154, a bump shell 156, a camera 159, and a rangefinding system 158. In some variations, the robotic creature can further include: a processing system 180, an input, an output, a communications module, a power storage system, an internal map, a set of positivity scores, and/or any other suitable component. The robotic creature functions as a robot companion, and can additionally or alternatively function as a portable connected system, an entertainment system, or perform any other suitable functionality.

Figure 9:
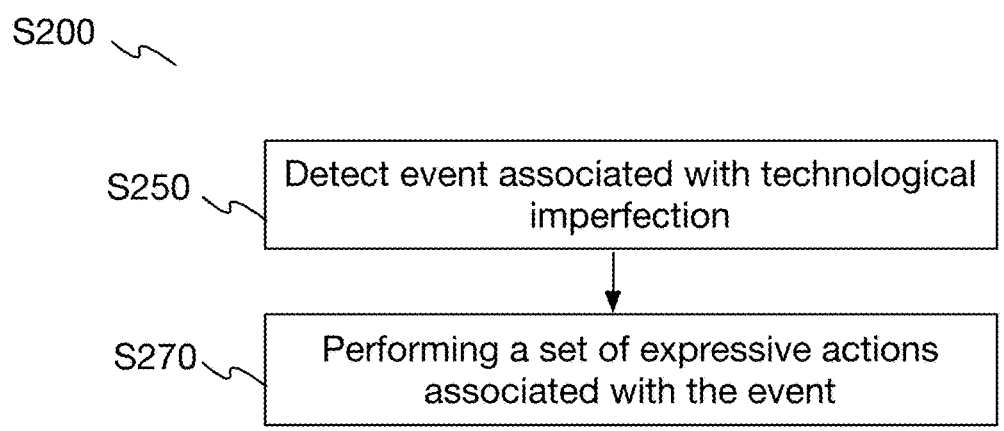
FIG. 9 is a flowchart diagram of the method for operating a robotic creature.
Figure 10:
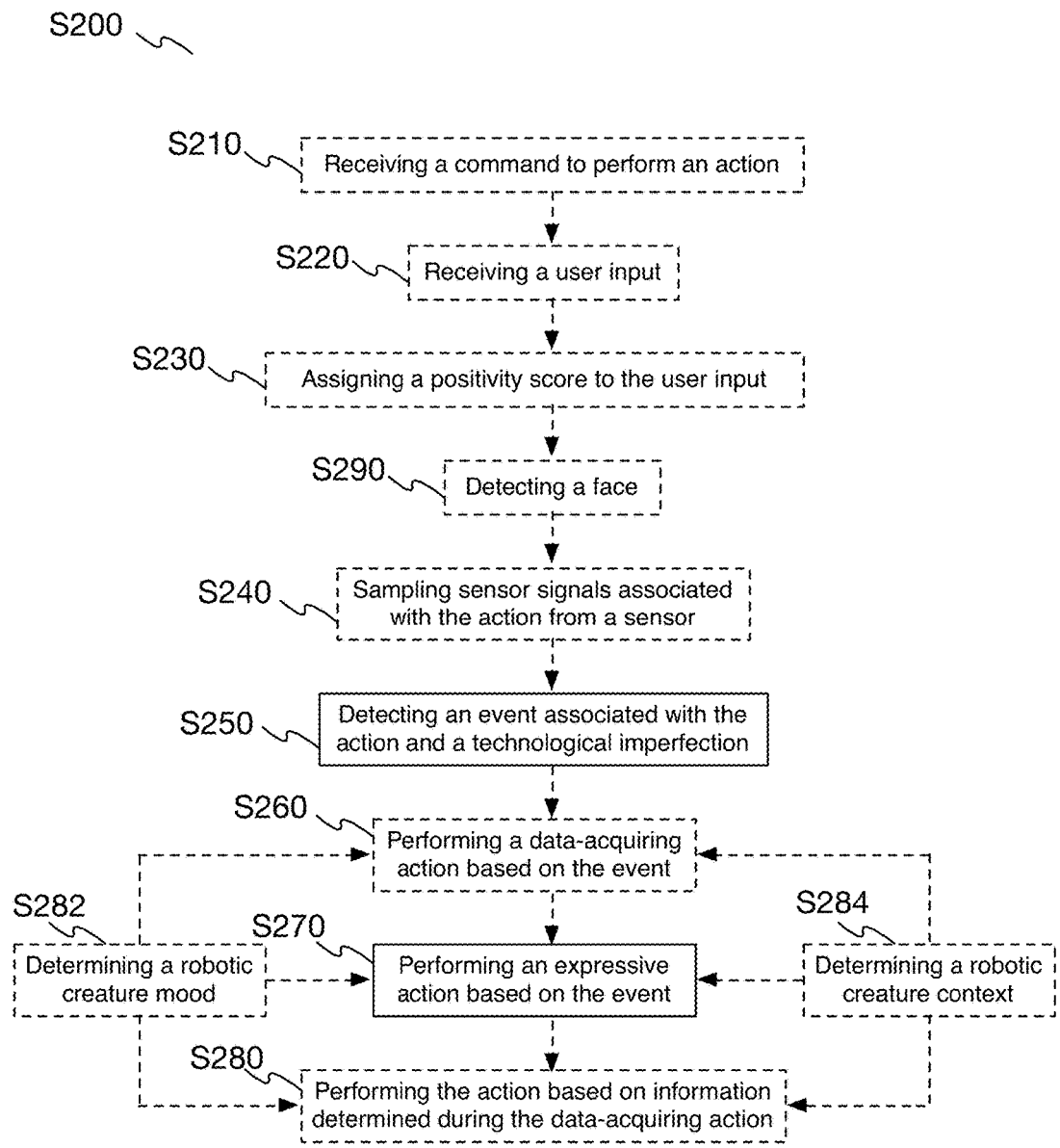
FIG. 10 is a flowchart representation of a variation of the method.

As shown in FIG. 9, robotic creature operation can include: detecting an event associated with a technological imperfection S250, and performing a set of expressive actions associated with the event S270. In some variations, parameters of the expressive actions can be dynamically adjusted based on context and/or the robot mood. As shown in FIG. 10, robotic creature operation can additionally include: receiving a command to perform an action S210, receiving a user input S220, assigning a positivity score to the user input S230, detecting a face S290, sampling sensor signals associated with the action from a sensor S290, performing a data-acquiring action based on the event S260, performing an expressive action based on the event S270, performing an action based on information determined during the data-acquiring action S280, determining a robotic creature mood S282, and/or determining a robotic creature context S284.

2. Benefits

In some applications, there can be a mismatch between robot capabilities and human expectations. In particular, humans expect robots to be reliable and stable—in other words, humans expect robots to be perfect. However, robots are oftentimes imperfect, due to the drawbacks of the underlying technology. For example, the rangefinding system of a home robot may have a limited field of view that cannot monitor the physical region proximal the robot base. Because of this blind spot, the robot may inadvertently run into objects, which is a mistake that humans typically expect robots to avoid.

The inventors have discovered that user expectations can be better aligned with the robot's capabilities by automatically performing robotic expressive actions (i.e. "romojis") when the robot encounters situations that implicate or involve a technological imperfection (e.g., underlying technology disadvantage). These expressive actions can be further used to cause the users to "forgive" robot imperfections or miscues (e.g., by acting and looking cute and loveable), and to facilitate a more enjoyable user interaction with the robot and connected technologies. For example, when the robot runs into the object, the robot can detect object contact, play a sound associated with confusion or mistake, actuate the head and/or main body to "look" at the object (e.g., direct the eyes toward the object), and then turn and drive away from the object. When the robot falls over, the robot can perform a "sadness" sequence, including playing a sound associated with sadness, actuating the head to direct the eyes downward, and lowering the eyelids. When the robot fails to understand a command (e.g., due to NLP drawbacks, connection lag, etc.) or complete a mission, the robot can respond with a quizzical sound and actuate the head upward. However, other expressive actions can be performed.

In some variants, user expectations can be further aligned with robot capabilities by designing the robot to be incapable of autonomously speaking in natural language. The inventors have discovered that, in some variants, the lack of an ability to speak in natural language causes users to lower their expectations of the robot's abilities (e.g., the users do not expect the robot to be too intelligent or capable).

In some variants, the limited abilities of the robot (e.g. inability to speak) and/or the design features of the robot (e.g. lack of mouth, large eyes, general 'creature-like' appearance) can serve the purpose of preventing or minimizing the "uncanny valley" phenomenon, which is characterized by users' general revulsion to robots that appear to be nearly human.

Figure 19:
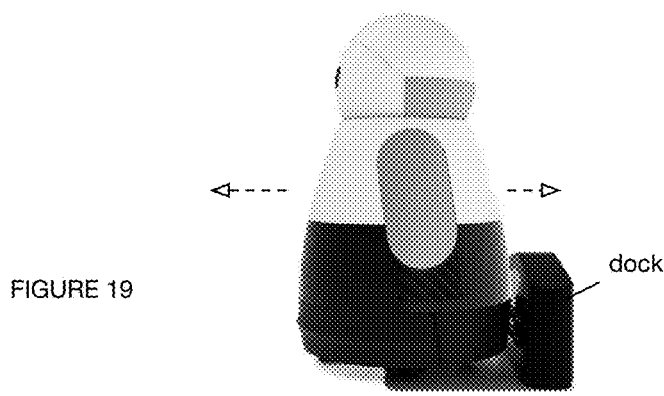
FIG. 19 is an example of robotic creature interfacing with a dock.

However, lowering user expectations too much comes at the risk of robot nonuse. To mitigate this risk, the robot can include some basic response capabilities, such as being able to give simple yes/no responses (e.g., by nodding or shaking the robot's head), which can increase continuous robot usage while maintaining the lowered user expectations. The robot can additionally or alternatively promote robot usage by "comprehending" natural language commands from the user (e.g., using natural language processing), in addition to supporting other methods of command input, such as remote control commands. The robot can additionally or alternatively promote robot usage by autonomously performing some tasks, such as roaming around a house (e.g., to autonomously map the house and rooms), docking itself when the battery is low (and/or to receive updates or other data from the dock; example shown in FIG. 19), learning household patterns, or autonomously performing any other suitable set of tasks.

In some variants, the robot can promote usage by performing data-acquiring actions that remedy technological imperfections through the collection of data. These can be performed during or after an expressive action. In some variants, the expressive action itself facilitates data acquisition and imperfection resolution. For example, while the robot is performing an expressive action, it can concurrently be acquiring information to overcome an event associated with a technological imperfection. This allows the robot to overcome its technological imperfections with little to no user input, which potentially increases the functionality and dependability of the robot. In a specific example, the robotic creature can turn its head to "look around" when in an unrecognized physical space, which can give the robotic creature's mapping and/or navigation system sufficient time to sample the unrecognized space and localize the robotic creature within a predetermined map based on the sampled signals. In this example, the robotic creature can optionally turn its body to "look around" before, after, or during the head animation. This can increase the mapping and/or navigation system's field of view, which, in turn, can increase the number of visual features that can be used to locate the creature within the predetermined map. In a second specific example, the robotic creature can inch forward, toward a user, in response to receipt of an unrecognized (e.g., oral) command from the user. This can reduce the sampled signal's noise by sampling a clearer command (due to increased proximity to the user). In a third specific example, the robotic creature can back up in response to collision with an obstacle, which gives the robotic creature space to clear the obstacle. In this example, the robotic creature can concurrently actuate the head to "look down" at the obstacle as it is backing up, which can function as an expressive action and/or enable the robotic creature to direct a camera system (e.g., monocular, stereocamera, etc.), located in the robotic creature's head, toward the obstacle. This can enable the robotic creature's vision system to determine obstacle parameters (e.g., dimensions, geometry), which can be fed into the navigation system to route the robotic creature around the obstacle. However, any suitable data-acquiring actions can be performed.

The robot can also promote usage by performing expressive actions that cause users to create an emotional bond with the robot. For example, users are more likely to interact with the robot on a continuous basis when the robot recognizes household members (e.g., using facial recognition based on the video sampled by the camera) and automatically interacts with the recognized household member; when the robot occasionally follows users around in a pet-like manner; when the robot performs a "happy" expressive action in response to user interaction with the robot (e.g., looks up and actuates the eyelids such that half-moon lower eyelids partially obscure the eye); and when the robot reacts to stimuli (e.g., with happiness, sadness, confusion, or tiredness, as animated using the robot head, eyelid mechanisms, lights, and/or sounds). The robot can additionally dynamically adjust the parameters of the expressive actions (e.g., based on context, historic data, etc.), such that an expressive action does not become repetitive. However, robot usage can be otherwise promoted.

3. System.

As shown in FIG. 1, the robotic creature includes an actuatable head defining eyes, an eyelid mechanism, a body, a drivetrain, and a set of sensors. In some variants, the sensors can include: an array of touch sensors arranged on the head, wheel drop sensors, a bump shell (e.g., shell with contact sensors), a camera, and a rangefinding system, but can additionally or alternatively include any other suitable set of sensors. The system can further additionally include a processing system, an input, an output, a communications module, a power storage system, an internal map, a set of positivity scores, and/or any other component.

The head 110 of the robotic creature functions to perform all or part of an expressive action, and additionally functions to define the eyes and support the eyelid mechanism. The head 110 is preferably substantially spherical, but can alternatively be humanoid, dog-like, or have any other suitable shape. A dimension of the head 110 (e.g., the head diameter) is preferably approximately ⅔ of the height of the body, but can alternatively be larger or smaller. The head 110 is preferably hollow and functions as a shell that hides the head mechanisms and sensors, but can alternatively be solid or otherwise configured. The head 110 is preferably made of plastic, but can alternatively be made of metal, ceramic, or any other suitable material. The head 110 is preferably white or cream, but can alternatively be black, red, blue, green, yellow, or any other suitable color. The head 110 can include a body interface where the head mounts to the body, but can alternatively include any other suitable mounting point. The body interface preferably includes an aperture, but can include a set of linkages or be otherwise configured. The head 110 is preferably recessed into the body, but can alternatively overlap the body, be connected by a column (e.g., a "neck"), or be otherwise connected to the body. The head 110 can include auxiliary mounting points (e.g., holes, clips, adhesive, etc.) that can function to mount accessories (e.g., ears, hats, etc.), auxiliary sensors (e.g., LIDAR, etc.), or any other suitable auxiliary system. Alternatively, the head 110 can be substantially smooth, textured, or have any other suitable feature.

The head 110 preferably defines a set of eyes 120, which function to give the robot an anthropomorphic or creature-like look. The eye 120 can additionally function as apertures connecting sensors housed in the head with the ambient environment. The head preferably defines two eyes 120 separated by a portion of the head (e.g., the "nose"), but can alternatively define any suitable set of eyes 120. The eye 120 is preferably spherical, but can alternatively be obloid, almond-shaped, semicircular, a circle segment, lunular (i.e., crescent-shaped), polygonal (e.g., triangular, octagonal), or any other suitable shape. The eye 120 can be defined by a hole in the head, by an outline drawn on the head exterior, by different material mounted to or embedded within the head, by a thinned-out region of the head, or otherwise defined. In variants where the eye 120 is a hole, the hold can be a countersunk or tapered hole (e.g., a hole with an angled bezel connecting the exterior hole perimeter to the interior hole perimeter), a simple hole, or any other suitable hole. A dimension of the eye 120 (e.g., diameter) is preferably ⅕ the diameter of the head, but can alternatively be larger or smaller. Different eyes 120 on the head preferably have the same size, shape, and profile, but can alternatively have different parameters. The head preferably does not include a mouth, but can alternatively include a static or articulable mouth. The head can support one or more of the sensors. In one example, the head can include one or more cameras (e.g., arranged in an eye socket defined by the head) and an array of capacitive touch sensors arranged along the top of the head (e.g., opposing the body mounting point).

In one variation, the head includes a camera 159 (e.g., used for object recognition, facial recognition, etc.) recessed within the housing and aligned with the eye, wherein the camera 159 is optically connected to the external environment through the eye socket. However, the camera 159 can be otherwise arranged. The camera 159 preferably does not fill the entire eye, but can optionally have a lens the same dimension as and/or fills the eye. The camera 159 is preferably biased toward the upper left, such that less of the frame is occluded by the nose, but can alternatively be coaxially aligned with the eye or otherwise arranged. In one embodiment, the camera assembly can optionally include a camera concealing assembly that functions to hide the camera within the eye. In one example, the camera concealing assembly can include, in order from the camera toward the housing exterior: a camera shroud connecting the bezel of the camera lens and the housing interior, a glass layer (e.g., tinted or transparent) and a tinted film over the eye bracket. The camera-concealing assembly can additionally include blackout paint (e.g., matte), textured black pigmented resin, felt, or any other suitable low-reflectance material that functions to decrease ingressed light reflection out of the eye socket. However, the camera assembly can include any other suitable camera-concealing assembly. In the event that the camera-concealing assembly includes a suitable low-reflectance material, a processing system of the robotic creature can include a color correction process to calibrate the camera footage based on a predetermined color shift. In one example, the camera-concealing assembly includes a black tinted film designed to appear substantially opaque to a user while simultaneously being substantially transparent to allow the camera to record the environment of the robotic creature.

Figure 3A:
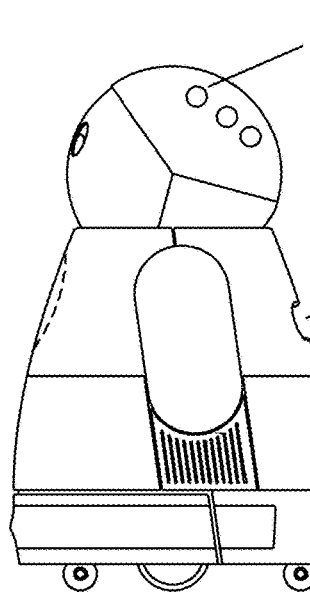
FIGS. 3A and 3B are an illustration of a side view of a variation of the robotic creature with touch sensors and a top-down view of a variation of the robotic creature with touch sensors, respectively.
Figure 3B:
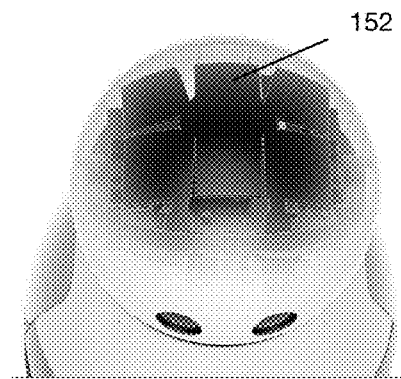

In a second variation, example shown in FIGS. 3A and 3B, the head includes a set of touch sensors 152 that function to detect contact with the head. This can be particularly useful in robotic creature variants that react to head petting (e.g., continuous, directional touches), that enable touch commands (e.g., the robot ceases movement when touched), or in any other suitable application. The touch sensor 152 can include one or more: capacitive touch sensors, resistive touch sensors, load sensors, tixels, light sensors (e.g., wherein a touch is detected in response to ambient light obstruction), or any other suitable touch sensor 152. The touch sensor 152 is preferably arranged along the top of the head (e.g., opposing the body mounting point), but can alternatively be arranged along the back of the head or along any other suitable portion of the head. The touch sensor(s) 152 can be arranged in a sheet, an array, concentric circles, or in any other suitable pattern. In one variation, the head includes individually indexed touch sensors 152 arranged in a two-column array along the top and back of the head, wherein the columns extend parallel to or at an acute angle to the sagittal axis of the head (e.g., axis extending front-to-back). However, the touch sensors 152 can be otherwise arranged.

The head can additionally or alternatively include a head mechanism, which functions to actuate the head. The head mechanism preferably pans and tilts the head relative to the body housing (e.g., yaws and pitches, respectively), but can alternatively or additionally roll the head (e.g., to create a quizzical look) or otherwise actuate the head. Each head degrees of freedom (head DOF) is preferably directly driven by an independent drive mechanism (e.g., including a force generation mechanism, such as a motor, and a force translation system, such as a series of linkages). Alternatively, all or a subset of the head DOFs can be driven by a common drive mechanism. However, the head DOFs can be indirectly driven or otherwise driven.

The head mechanism is preferably mounted to the body at a first end, extends into the head cavity through the body interface on the head, and mounts to the head interior at a second end. However, the head mechanism can be mounted to the body at a first end and mounted to the bottom of the head at a second end, or otherwise mounted.

In one variation, example shown in FIG. 4, the head mechanism includes a body mount, a head chassis rotatably mounted to the body mount, a force generation mechanism (e.g., a motor), and a force translation mechanism connecting the force generation mechanism to the head chassis. However, the head mechanism can be otherwise configured.

The body mount functions to mount to the body (e.g., body housing interior), but can alternatively mount to any other suitable portion of the robotic creature. The body mount is preferably arranged parallel the robotic creature's transverse plane (e.g., parallel the head sagittal axis), but can be otherwise arranged.

The head chassis functions to support the head components (e.g., processing systems, eyelid mechanism, etc.) and to mount the head mechanism to the head housing interior, but can additionally or alternatively perform any other suitable function. The head chassis is preferably rotatably mounted to the body mount, but can be translationally mounted or otherwise mounted. The head chassis rotational axis is preferably perpendicular to the plane of the body mount, but can be otherwise arranged. The rotational mechanism enabling head chassis rotation relative to the body mount can include: an annular track, bearings within the track, dampening fluid within the track (e.g., to smooth out chassis rotation), or include any other suitable rotational mechanism.

The force generation mechanism functions to generate the force that rotates the head chassis. The force generation mechanism can be mounted to the head chassis, the body mount, or to any other suitable component. The force generation mechanism can be a linear actuator, circular or rotary actuator, or be any other suitable actuator. The force generation mechanism is preferably a motor, but can alternatively be a solenoid or any other suitable force generation mechanism. The motor is preferably an electric motor (e.g., brushed or brushless, DC or AC), but can be any other suitable motor. In a first variation, the force generation mechanism can be arranged with the force generation mechanism rotational axis (e.g., rotor axis) aligned with the rotational mechanism's rotational axis. In a second variation, the force generation mechanism can be arranged with the force generation mechanism rotational axis offset but substantially parallel the rotational mechanism's rotational axis. In a third variation, the force generation mechanism can be arranged with the force generation mechanism output substantially perpendicular the rotational mechanism's rotational axis. However, the force generation mechanism can be otherwise arranged relative to the rotational mechanism's rotational axis.

The force translation mechanism functions to connect the force generation mechanism to the head chassis. The force translation mechanism can be a set of linkages (e.g., 2-bar linkage, etc.) connected to the force generation mechanism's output and a mounting point on the head chassis, a belt or chain drive extending between the output and a gear statically connected to the head chassis, or be any other suitable force translation mechanism.

Figure 5C:
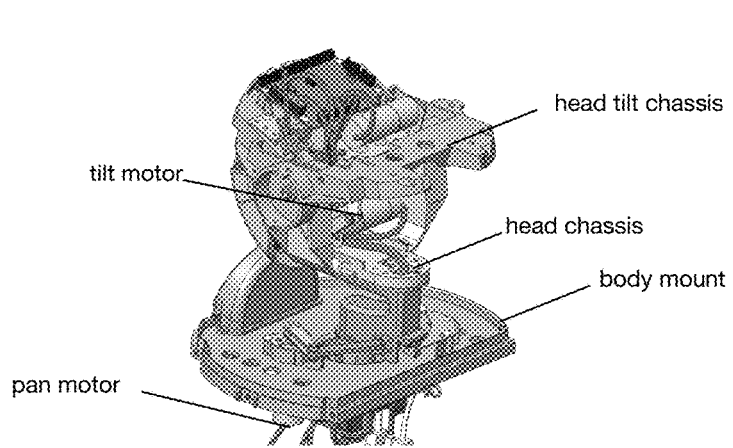

In one example, the head mechanism includes: a body mount mounted to the body housing interior; a main head chassis rotatably mounted to the body mount and rotatable about a rotational axis perpendicular the body mount plane; a head tilt chassis rotatably mounted to the main head chassis, the head tilt chassis rotatable relative to the main head chassis about a tilt rotation axis parallel the body mount plane and otherwise statically fixed to the main head chassis, the head tilt chassis statically mounted to the head housing interior; a pan motor (e.g., electric motor, such as a brushed DC motor) mounted to the body mount with a rotor axis perpendicular the body mount plane; a pan force translation mechanism connecting the pan motor's rotor to the main head chassis (e.g., two-bar linkage, configured to actuate within a plane substantially parallel the body mount plane); a tilt motor (e.g., second electric motor, such as a brushed DC motor) mounted to the head chassis with a rotor axis parallel the body mount plane (example shown in FIG. 5A); a tilt force translation mechanism connecting the tilt motor's rotor to the head tilt chassis (e.g., two-bar linkage, configured to actuate within a plane substantially perpendicular the body mount plane) (examples shown in FIGS. 5B and 5C). The head mechanism actuators can be individually controlled by the same or different processing systems. However, the head mechanism can be otherwise configured and controlled.

The eyelid mechanism 122 of the robotic creature functions to generate expressive actions. In particular, the eyelid mechanism 122 can convey: happiness, by raising the lower semicircular lids 128 to obscure the lower portion of the eye; sadness, by lowering the upper lids 128 to obscure the upper portion of the eye; blink, by lowering, then raising, the upper lids 128; surprise, by lowering the upper lids and/or the lower lids repeatedly (e.g. in a fluttering or blinking motion), or any other suitable expressive action. In a first variation, the eyelid mechanism 122 is operable between an open-eye position, where little to none of the eyelid mechanism 122 obscures the eye; and a smiling position, where the lower lid 128 obscures a portion of the eye. In a second variation, the eyelid mechanism 122 is further operable in a lowered position, where the upper lid 128 obscures a portion or all of the eye. However, the eyelid mechanism 122 can be operable in any other suitable position.

Figure 7:
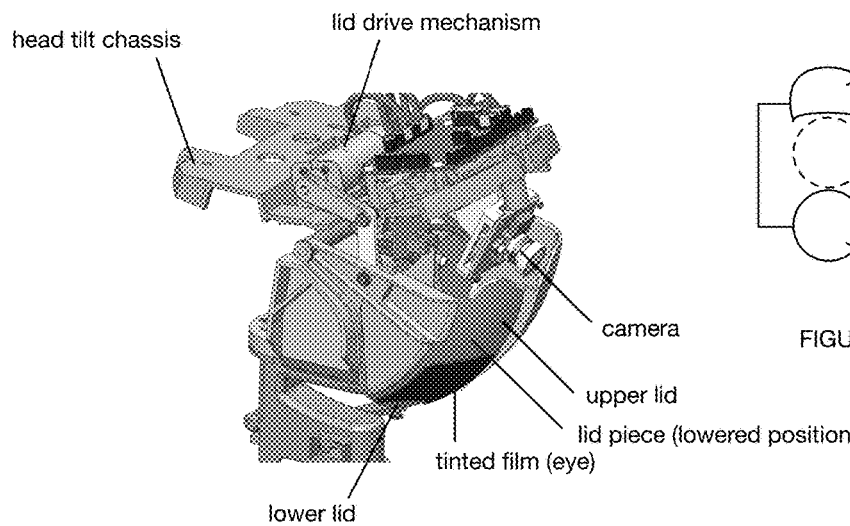
FIG. 7 is an illustration of a variation of the eyelid mechanism.

The eyelid mechanism 122 preferably includes a lower lid 128 and a lid drive mechanism (example shown in FIG. 7), but can alternatively or additionally include an upper lid 126 or any other suitable component. The lower lid 128 is preferably a semicircle arranged with the arcuate region proximal the head top, but can alternatively be another circle segment, lunular (e.g., with the concave edge proximal the head top), rectangular, or otherwise shaped or positioned. The radius of the lower lid 128 is preferably substantially equal to or greater than the eye radius, but can be otherwise dimensioned. The eyelid mechanism 122 preferably includes a first and second lower lid 128 for the first and second eye, respectively, but can alternatively include any suitable number of lower lids 128. The lower lid 128 is preferably part of a lid piece rotatably mounted to the head, more preferably rotatably mounted to the head chassis (e.g., to the head tilt chassis), but can be otherwise connected to the head. When the eyelid mechanism 122 includes multiple lower lids 128, the lower lids 128 can be part of the same lid piece or be separate pieces.

The lid drive mechanism functions to actuate the lid between one or more positions. The lid drive mechanism can actuate one or more lid pieces (e.g., first and second lower lids, upper and lower lids, etc.), together or separately. The lid drive mechanism can pull the lower lid up, pull the lower lid down, or otherwise actuate the lower lid. The lid drive mechanism can include a lid actuation mechanism (e.g., a motor) and a lid force translation mechanism (e.g., a 2-bar linkage connected to the lid piece and configured to actuate in a plane perpendicular the body mount plane), but can alternatively or additionally include any other suitable component. In one example, the lid drive mechanism includes a lid motor (e.g., a brushed DC motor) mounted to the head tilt chassis with a rotor axis parallel the body mount plane and a lid force translation mechanism connecting the lid motor's rotor to the lid piece. In a first specific example, the lid motor and the linkage are arranged above the lid piece. In a second specific example, the lid motor can be mounted below the lower lid piece and the lid force translation mechanism is preferably mounted to an upper portion of the lid piece, such that the lid drive mechanism pushes the lower lid up to achieve the smiling position (e.g., raised position), be mounted above the lower lid piece, or be otherwise mounted.

Figure 8:
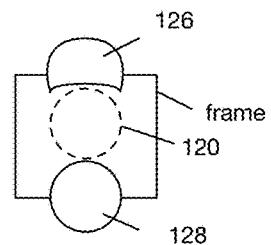
FIG. 8 is a schematic representation of a variation of a lid piece.

The eyelid mechanism 122 can optionally include an upper lid mechanism. As shown in FIG. 8, The lower edge of the upper lid 126 is preferably concave (such that the upper lid is lunular), but can alternatively be convex (such that the upper lid is a circle segment), rectangular, or have any other suitable profile. The eyelid mechanism 122 preferably includes a first and second upper lid 126 for the first and second eye, respectively, but can alternatively include any suitable number of upper lids. The upper lid 126 is preferably part of the lid piece (e.g., shared with the lower lid), wherein the upper and lower lid sub-pieces are preferably statically connected by a frame, but the upper lid 126 can alternatively be supported by a separate lid piece. The lowermost edge of the upper lid 126 is preferably separated from the uppermost edge of the lower lid 128 by an eye diameter, but the separation distance can be larger or smaller. Preferably, both the upper lid 126 and the lower lid 128 of an eye are controlled by a single lid drive mechanism; alternatively, there can be separate lid drive mechanisms for each lid, for each eye, or there can be lid drive mechanisms in any other arrangement.

The body 130 of the robotic creature functions to mount the head and house the drivetrain, navigation sensors, and other sensors. The body 130 can additionally function to define a handle, which can be used to manually lift the robotic creature. The body 130 can additionally function to mount the outputs (e.g., speakers, LEDs, etc.) and/or any other suitable component The body 130 is preferably rotund (e.g., ogived), but can alternatively be spherical or have any other suitable shape. The body 130 is preferably hollow and functions as a shell, but can alternatively be solid or otherwise configured. The body 130 is preferably made of the same material and color as the housing, but can be made of a different material or have a different color.

Figure 18A:
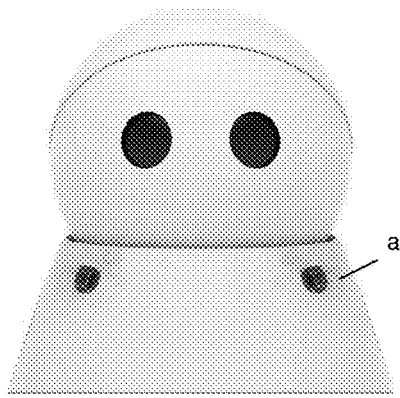
FIGS. 18A-18D are examples of: the acoustic sensor, acoustic output, rangefinding system, and drivetrain, respectively, and the respective component placements in variants of the robotic creature.
Figure 18B:
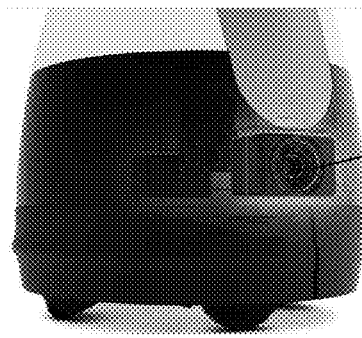
Figure 18C:
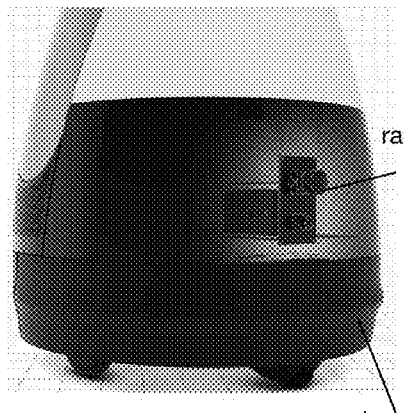
Figure 18D:
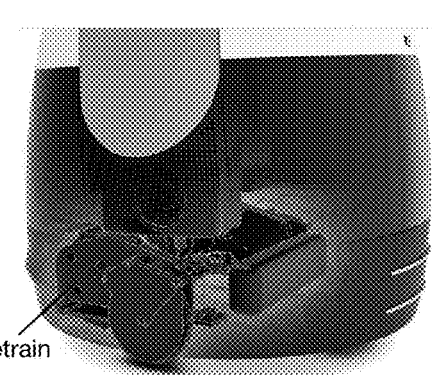

The drivetrain 140 of the robotic creature functions to move the robot within a physical volume, example shown in FIG. 18D. The robotic creature preferably includes a first and second driven wheel, but can alternatively include any suitable number of driven wheels. The drivetrain 140 preferably includes a differential drive driving a first and second wheel (e.g., powered by a first and second motor, respectively), but the wheels can alternatively be driven together (e.g., powered by the same motor), or otherwise driven. The rotational axis of the first and second wheel are preferably arranged parallel the transverse axis of the robotic creature, but can be otherwise arranged. The drivetrain 140 can additionally or alternatively include one or more free turning wheels or casters, treads, passive translation mechanisms (e.g., skids, keels, etc.), or any other suitable translation mechanism. The free turning wheels are preferably arranged along an axis centered between and perpendicular the rotational axis of the first and second wheel, but can be otherwise arranged. The drivetrain 140 can additionally include suspension (e.g., spring loaded, damping, etc.) mounted to the drive wheels, casters, or any other suitable component. The drivetrain 140 can optionally include wheel drop sensors 154, rotary encoders, or any other suitable sensor connected to one or more wheels.

The sensors 150 of the robotic creature function to monitor the ambient environment surrounding the robot and/or as inputs into the robotic creature. The robotic creature can include: optical sensors, such as ambient light sensors and cameras; orientation sensors, such as accelerometers, gyroscopes, and altimeters; acoustic sensors, such as microphones (example shown in FIG. 18A); proximity sensors, such as capacitive or photoelectric sensors; contact sensors, such as limit switches connected to an outermost portion of the body perimeter; weight sensors; power sensors, such as Hall effect sensors; temperature sensors (e.g., thermistor); pressure sensor (e.g., barometer); or any other suitable sensor; location systems, such as GPS systems and trilateration systems; rangefinding systems 158, such as direct or indirect TOF systems, LIDAR, and stereoscopic systems; or any other suitable set of sensors. The sensors 150 can be mounted to the head, body, drivetrain, or any other suitable portion of the robotic creature. In one variation, the robotic creature includes a depth sensor (e.g., TOF system) arranged about the body midsection, a bump shell 156 tracing the body bottom perimeter, and a set of microphones substantially evenly distributed about the perimeter of the body proximal the head (examples shown in FIGS. 18A and 18C). The bump shell 156 is preferably connected to an internal mounting point (e.g., wireform) by a set of springs, and transiently coupleable to a set of limit switches mounted to the body housing interior. In operation, the bump shell is translated radially inward when the bump shell 156 contacts an obstacle, which triggers the limit switches. The springs then return the bump shell 156 to its standby position. However, the bump shell 156 can include resistive sensors, capacitive sensors, fluid-pressure sensors (e.g., wherein the bump shell is filled with a fluid), or include any other suitable set of sensors. However, the robotic creature can additionally or alternatively include any other suitable combination of sensors positioned in any other suitable arrangement.

The robotic creature can additionally include: inputs 170 (e.g. user inputs), outputs, a processing system 180 (e.g., CPU, GPU, microprocessor, etc.), a communications module (e.g., WiFi, BLE, Zigbee, cellular, etc.), a power storage system (e.g., rechargeable battery), or any other suitable component, which can be mounted to the body, head, or any other suitable mounting point. Outputs can include: speakers (example shown in FIG. 18B), lights, robot component actuators (e.g., the eyelid mechanism, head mechanism, etc.), screens, or any other suitable output. In one variation, audio output by the speakers (e.g., the robotic creature's "voice") is used in conjunction with other outputs to create an expressive action. In one example, the audio can be selected from a set of music box sounds. In another example, the audio is a string of instrumental sounds from an African thumb piano. However, the audio can be any other suitable audio. Preferably, various features of the audio can be manipulated, such as the pitch, pitch envelopes, attack envelopes, frequency, or any other feature, to express emotion, convey information, prompt a user to provide information, or for any other purpose. In a second variation, the robotic creature can include a chest light (e.g., LED) arranged within the body housing between the head and drivetrain. The chest light preferably shines through the body housing (e.g., through a region defined by a cone of LEDs, through a diffusive film, through a transparent window or aperture, through a thinned-out region of the body housing, etc.), but can be otherwise arranged and configured. Preferably, the chest light can display a variety of different colors of light but can alternatively display a single color of light. The chest light can be selectively operated based on the robotic creature expressive action, a robotic creature mood (e.g., determined based on historic accomplishments, human interaction, etc.), operation mode (e.g., recording mode, playback mode), or otherwise operated. However, the robotic creature can include any suitable set of components.

The robotic creature can additionally include an internal map 160, which functions to serve as a reference for guiding the robotic creature around its environment. Additionally or alternatively, the internal map 160 functions to localize the robotic creature within the environment. The internal map 160 can be determined using the rangefinding system (e.g., mapping sensors) on-board the robotic creature (e.g., incrementally generated, frame by frame, as the robotic creature moves through the space), an indoor positioning system, manually determined (e.g., generated by a user, annotated by a user), or otherwise determined. Preferably, the internal map 160 is a virtual representation of the traversable surroundings of the robotic creature (e.g. the layout of a house), which includes approximate dimensions of the space, the approximate locations and sizes of landmarks (e.g. obstacles, entrances/exits, etc.) within the space, and/or any other feature of the traversable space of the robotic creature. The virtual representation can be a point cloud, semantic object map, feature map (e.g., with a set of feature descriptors), or have any other suitable structure. Preferably, the internal map 160 is stored within a processing system (e.g. microprocessor) of the robotic creature, but can alternatively or additionally be stored within a remote server or elsewhere. Preferably, the internal map 160 is determined during an initialization phase of the robotic creature (e.g. after unboxing of the robotic creature, upon first placement of the robotic creature into an environment, etc.), but can alternatively or additionally be determined at another time, at multiple times, be continuously updated, or be otherwise determined and/or altered. In one variation, the internal map 160 receives input from an authorized user. In one example, the internal map 160 includes "off-limit" room designations (e.g., blacklisted geofences, physical regions, physical volumes), wherein the "off-limit" room designations are assigned by an authorized user and prevent the robotic creature from entering the designated rooms. The room designations can be assigned through a voice command (e.g. telling the robotic creature "stay out of this room" when the robotic creature enters the room during an initialization phase), selected through an application on a user device, or otherwise designated.

4. Method.

As shown in FIG. 9, the method S200 for robotic creature operation includes: detecting an event associated with a technological imperfection S250 and performing a set of expressive actions S270 associated with the event. Additionally, the method can further include: receiving a command to perform an action S210, sampling sensor signals associated with the action from a sensor S240, performing a data-acquiring action S260, receiving a user input S220, assigning a positivity score to the user input S230, determining a robotic creature mood, determining a robotic creature action based on the robotic creature mood, and/or performing an action based on information determined during the data-acquiring action S280. In some variations, parameters of the expressive actions can be dynamically adjusted based on context and/or the robot mood. The method functions to reduce negative user responses to technological imperfections.

The method can include receiving a command or instruction to perform an action S210, which functions to initiate the performance of a robotic creature action (e.g. movement to a specified location). The command can be received from a user (e.g., authorized user, any user), client instance associated with the user (e.g., user logged into their account), an auxiliary device (e.g., Google Home™, a Lifx™ bulb, etc.), from a remote computing system, automatically generated, or otherwise determined. The command can be received at a command time, which can be within a predetermined time window (e.g., before, after, during) of technological imperfection (e.g., failure event) determination. Preferably, the command is received at a sensor and transmitted to a processing system of the robotic creature, but can alternatively be directly received at the processing system of the robotic creature, predetermined, determined using an algorithm (e.g. a machine learning algorithm), accessed from a lookup table or remote server, or received or determined in any suitable way. Preferably, S210 is performed first in the method, but can additionally or alternatively be performed at any point in the method. Additionally, the method can include performing any part or all of the action. Examples of the command include: voice commands to perform an action, such as "go to the kitchen" (e.g., wherein the command content, signal patterns, or other input features can be mapped to a predetermined library of known commands); component operation commands, such as instructing an imaging system (e.g., camera) to record images (e.g., still frames, videos, etc.); navigation instructions to move to a waypoint; or any other suitable command.

The method can additionally include receiving a user input S220, which functions to initiate a command to a robotic creature. Additionally or alternatively, S220 can function to determine a robotic creature mood. Preferably, the user input is received from a user in physical proximity to a user, but can alternatively be received from a user via a user device or access point, predetermined, or otherwise received. Preferably, the user input is received concurrently with receiving a command to perform an action, but can additionally or alternatively be performed prior to receiving a command to perform an action, after receiving a command to perform an action, at multiple times throughout the method, or at any other time. Preferably, the user input is received at a sensor of the robotic creature, but can alternatively be received directly at a processing system of the robotic creature. In a first variation, the user input is a voice command received at an audio sensor (e.g. microphone). In a second variation, the user input is a touch (e.g. petting) received at a contact sensor (e.g. capacitive touch sensor in the robotic creature head). In a third variation, the user input is the location of a user determined by the robotic creature's rangefinding system. In a fourth variation, the user input is a specific user identification determined through a facial detection method.

The method can additionally include scoring the user input, such as assigning a positivity score to a user input S230, which functions to assess a user's response to the robotic creature. Additionally or alternatively, S230 can function to determine a robotic creature's actions (e.g. toward a user), assess user satisfaction, and/or assess user mood. Preferably, a positivity score is assigned to a user input immediately after the user input is received or determined by the robotic creature, but can additionally or alternatively be determined at any point during the method, predicted using an algorithm (e.g. machine learning algorithm) or mathematical model, predetermined, or otherwise determined in any suitable way at any suitable time. Preferably, the positivity score is assigned to a user input in a processing system onboard the robotic creature, but can alternatively be assigned in a remote processing system, in a processing system on a user device, or elsewhere. Preferably, the positivity score is determined from a predetermined library (e.g. lookup table) but can alternatively be determined from a dynamically-determined library (e.g. a machine learning library), determined by an authorized user, or determined in any other way. Preferably, the positivity score is determined based on qualities of the user input, such as, but not limited to: the quality of a voice command (e.g. tone, pitch, content, frequency, volume, etc.), the quality of contact (e.g. on capacitive touch sensors, bump shell, etc.) with the robotic creature (e.g. frequency, duration, type, strength, etc.), the expression on a user's face (e.g. smile, frown, laughter, etc.), or any other quality. The positivity score can be a numeric score determined from a range of scores, a ranking relative to other user inputs, a score associated with a fixed number of categories (e.g. "high positive", "low positive", "neutral", "low negative", and "high negative"), a binary score assignment (e.g. "negative" or "positive"), or any other type of score. In one variation, the positivity score includes a weight factor, which can be incorporated into a weighted positivity score (e.g. FIG. 17), which determines the extent to which the associated positivity score influences actions of the robotic creature. In one example, the weight factor has a temporal quality (e.g. degrades the impact of the positivity score with time). In a second variation, the user provides a positivity score upon prompting from the robotic creature. In a third variation, a positivity score is assigned to something other than a user input, such as an event, an action, an environment, or other.

Figure 17:
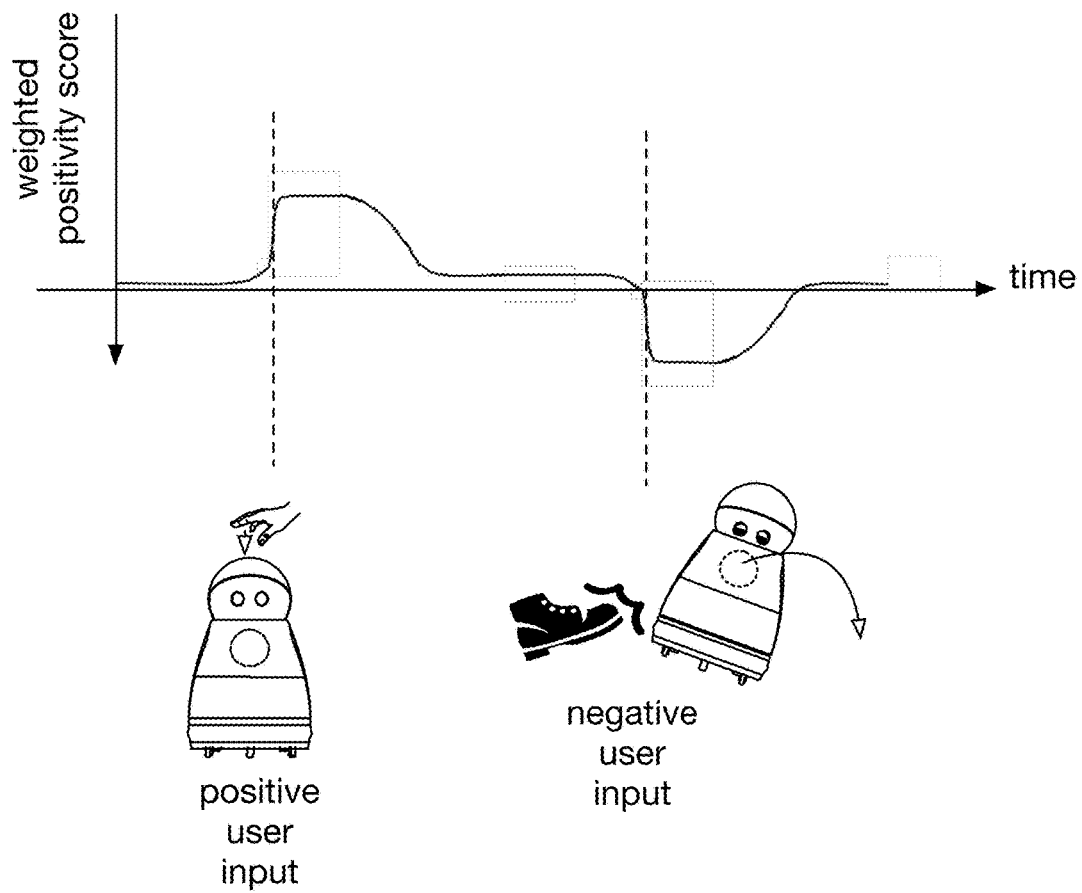
FIG. 17 is a depiction of the progression of a weighted positivity score over time.

In the example shown in FIG. 17, the robotic creature has a weighted positivity score associated with a user, which it updates after receiving user inputs. When the user has a positive interaction with the robotic creature (e.g. petting), the weighted positivity score increases and then degrades back to a baseline value with time. When the user has a negative interaction with the robotic creature (e.g. kicking), the weighted positive score decreases and then degrades back to a baseline value with time. In some variations, weighted positivity score influences the actions that the robot performs toward a user (e.g. lights up a chest light in front of users with high positivity scores and turns away from users with low positivity scores).

Figure 6:
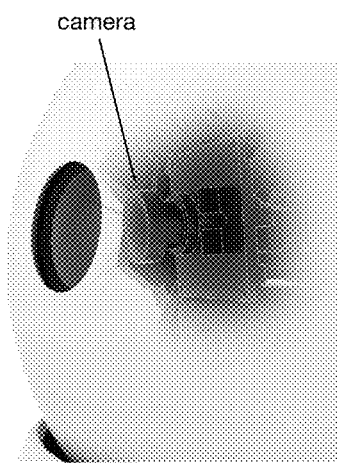
FIG. 6 is an illustration of a variation of the optical sensor.

The method can additionally include detecting a face S290, which functions to detect the presence of a user. Additionally or alternatively, S290 can function to seek help (e.g. receive a user input) in overcoming an event associated with a technological imperfection, and/or contribute to the performance of any robotic creature action. S290 can additionally include identifying a face (e.g. performing facial recognition), which functions to identify a specific user. The term 'user' herein refers to any person or animal (e.g. pet) located within the detectable vicinity of the robotic creature (e.g. the region able to be detected though the robotic creature's sensors). Preferably, S290 is performed with a sensor onboard the robotic creature (e.g. camera arranged in eye socket defined by the head, example shown in FIG. 6), but can alternatively be performed with an external sensor (e.g. camera in user device), wherein the external sensor is communicatively coupled to a processing system of the robotic creature. S290 can be performed with a feature detection method (e.g., color feature detector, texture feature detector, shape feature detector, motion feature detector, location feature detector, etc.), appearance-based method, genetic algorithm, or any other suitable computer vision method, or any other general method suitable for detecting and/or identifying a face. Preferably, S290 is performed any time the robotic creature detects a user but can alternatively be performed upon the receipt of a user input, upon detection of a user device on the same LAN or using a short-range communication system, the onset of an event associated with a technological imperfection, upon entrance into a new room, prior to performing an expressive action, prior to performing a data-acquiring action, or at any other time. In one variation, the robotic creature performs S290 upon detection of an event associated with a technological imperfection. For example, in the event that the robotic creature seeks user input during a data-acquiring action, the robotic creature can move backward to widen the field of view of its camera, detect a user, and then move toward the user to receive information from the user. The robotic creature can optionally track the user face (e.g., follow the user face with the robotic creature's head) when interacting with the user. In a second variation, the robotic creature performs S290 when it detects a specific user. In one example, the robotic creature performs S290 at the beginning of each day in order to perform an expressive action (e.g. turning on a light in the robotic creature's chest) for each recognized user in the robotic creature's user database. In a third variation, S290 is performed in order to provide specific robot actions to each user (e.g. based on the user's set of positivity scores). For example, the robot may perform S290 prior to performing an expressive action in order to reflect the user's positivity scores in the expressive action (e.g. 'scared' expressive action, such as fleeing, in the case that a user with a low positivity score is identified in S290).

The method can additionally include sampling sensor signals associated with an action from a sensor S240, wherein the action is preferably the action determined in S210, but can alternatively be any other robot action. S240 functions to detect an event associated with a technological imperfection. Additionally or alternatively, S240 can function to enable the appropriate performance of the action, monitor the performance of the action, determine a user response to the action, or any other suitable function. Preferably, S240 is performed using sensors and a processing system, wherein both the sensors and the processing system are onboard the robotic creature, but can alternatively be performed using remote elements (e.g. processor in a user device). Preferably S240 is performed after receiving a command to perform an action, but can alternatively be performed multiple times throughout the method, continuously throughout the method, at the onset of an event, or at any other time. In one variation, S240 is performed only at the onset of certain events (e.g. historically problematic events).

Detecting an event associated with a technological imperfection S250 functions to trigger expressive action performance. Additionally or alternatively, S250 can function to trigger data-acquiring action performance. Preferably, the event is associated with the action commanded in S210 but can alternatively occur independently or in relation to any other robotic creature action or event. The event (e.g., failure event) can be detected based on: signals sampled by the robot sensors (example shown in FIG. 10), based on changes between sampled signals, based on a user input, based on instructions received from a remote computing system (e.g., user device, such as smartphone or tablet, remote computing system, etc.), or based on any other suitable information.

Figure 13:
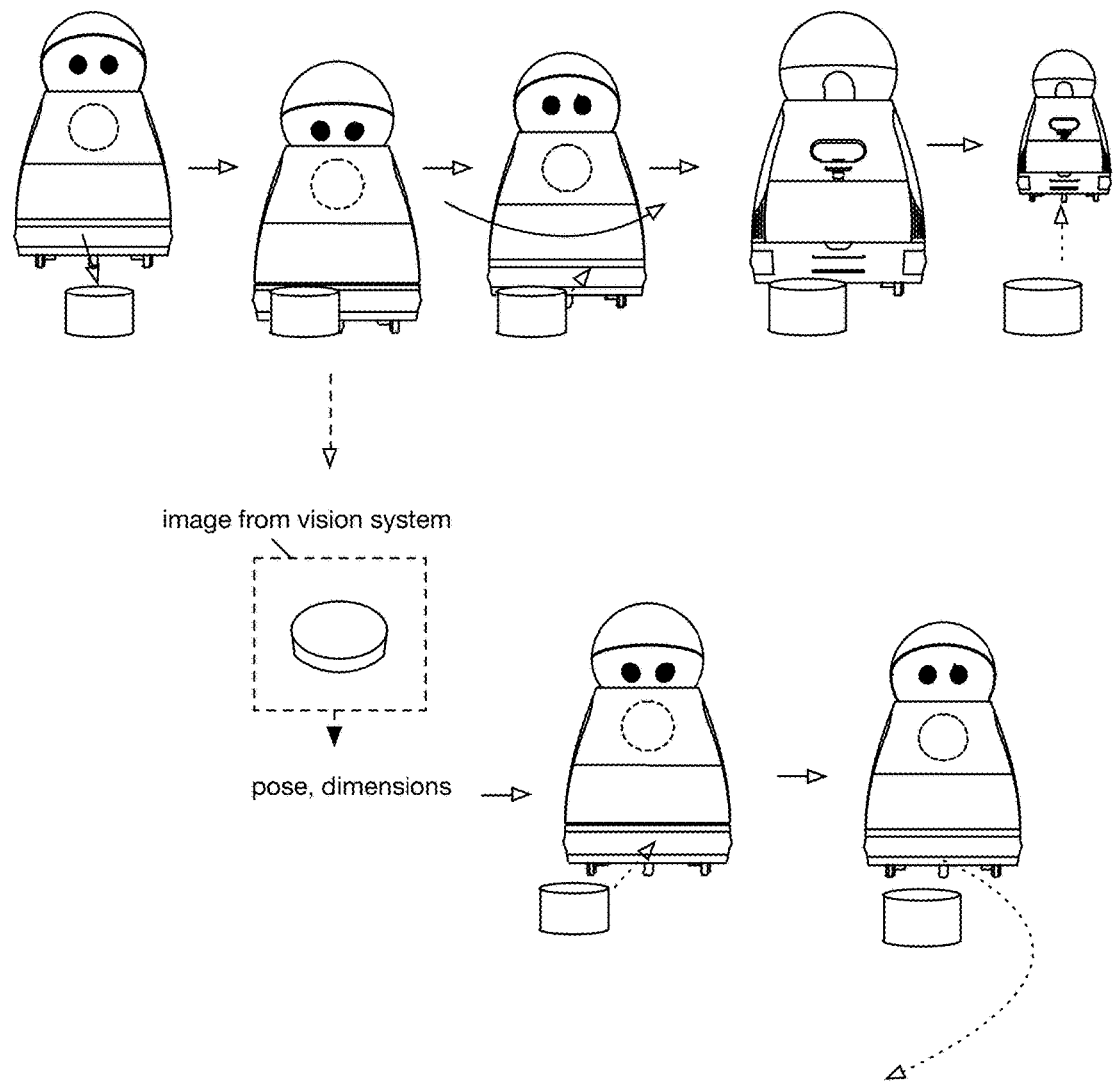

In a first variation, the event includes unexpected robot contact with an obstacle (e.g. FIG. 13). The unexpected contact can be due to: blind spots in environment monitoring system's field of view, dead zones inherent in the monitoring technology, intentional blind spots (e.g., regions that are not constantly monitored due to system cost or resource limitations), unexpected object movement, or due to any other suitable cause. The unexpected contact can be detected by: the robot bump shell, the robot's wheel encoders (e.g., measuring a backforce exceeding an expected backforce; measuring wheel rotation inconsistent with expected wheel rotation based on the measured robot kinematics; etc.), the touch sensors on the robot's head, or be otherwise detected.

In a second variation, the event includes unexpected obstacle movement (e.g. FIG. 14), as determined from the robot's object tracking methods. For example, unexpected object movement can include objects disappearing from the rangefinding field of view (e.g., in a manner inconsistent with the determined object trajectory).

In a third variation, the event includes determining that the robot is in an environment that the robotic creature is known to have problems with (problematic environment). The problematic environment(s) is preferably associated with a set of predetermined parameter values or range, but can be otherwise defined. Problematic environments can include: an environment with light of a given wavelength exceeding a threshold intensity value, cliffs (e.g., stairs) within the robot traversal path, overhangs lower than or the same level as the robot height within the robot traversal path, rough terrain (e.g., carpet), or any other suitable problematic environment. The problematic environment can be determined from: geographic location, ambient light sensors, wheel drop sensors, onboard rangefinding systems, beacons, terrain differences, historic sensor measurements (e.g., increased wheel resistance for a given geographic location), or from any other suitable set of sensors.

In a fourth variation, the event includes determining unexpected robotic creature motion. Examples of unexpected robotic creature motion include: tilt beyond a threshold angle (e.g., falling over), lift (e.g., determination that the robotic creature is being lifted), unexpected robot motion (e.g., moving faster than expected, moving slower than expected, coming to a complete stop), or any other suitable motion along any other suitable axis. The unexpected robotic creature motion can be determined by comparing the expected motion with the actual motion, or otherwise determined. The expected motion can be determined from path planning processes, drivetrain control instructions, or otherwise determined. The actual motion can be determined from orientation sensors, such as IMUs, accelerometers, and gyroscopes; rangefinding systems such as TOF systems and stereocamera systems; wheel drop sensors or wheel encoders; capacitive sensors (e.g., within the robotic creature handle); and/or any other suitable set of sensor outputs.

In a fifth variation, the event includes determining robotic creature operation parameters satisfying a predetermined condition. In one example, this can include determining that the robotic creature's state of charge is below a threshold SOC level. However, satisfaction of any other suitable set of predetermined conditions can be determined.

In a sixth variation, the event includes receiving an unrecognized command. In one example, this can include determining that a voice command received by the robotic creature is not included in a library of known voice commands.

In a seventh variation, the event includes determining that the robotic creature is in an unknown location (e.g., determining a new location event). In one example, this can include determining that the surroundings of the robot are not included in its internal map (e.g., based on features detected from signals sampled by the rangefinding system, camera system, etc.). In a second example, this can include robotic creature transitioning from a power-off to a power-on state. In a third example, this can include satisfaction of conditions associated with robotic creature delocalization (e.g., pick up and placement; arrangement in an unknown or new location; etc.). Examples of these conditions include: wheel unloading and re-loading (e.g., sampled by wheel drop sensors, motor encoders, drivetrain position sensors, etc.), handle actuation (e.g., wherein a touch-sensitive surface within the handle is actuated), inertial sensor patterns indicative of a pickup event (e.g., pitch or roll beyond a threshold angle; vertical acceleration above a threshold value), or any other suitable condition.

In an eighth variation, the event includes an initial setup. In one example, this can include movement away from a charging station for the first time. In another example, this can include a restart (e.g. reboot) of the operating system of the robotic creature, determination that the robotic creature is unassociated with an internal map, receipt of a setup command from a user, or any other suitable initial setup event. However, any other suitable event associated with a technological imperfection can be determined by the robotic creature.

The method can additionally include performing a data-acquiring action based on the event S260, which functions to determine information associated with overcoming the event (e.g., failure event) associated with a technological imperfection. Additionally or alternatively, S260 can function to determine information associated with the performance of an action (e.g. the action commanded in S210) or any part of the method, determine an alternative action, improve a user impression of the robotic creature (e.g. perform an action predicted to result in a high positivity score), or any other function. The data-acquiring action can be associated with the failure event, with the expressive action, with the underlying data used to perform the failed action, or otherwise associated. Preferably, the data-acquiring action is determined based on the type of event associated with a technological imperfection (e.g. collision, unrecognized voice command, etc.), but can additionally or alternatively be determined based on a sensor signal, a user specification, a predetermined command, or any other suitable signal. The data-acquiring action preferably includes a predetermined sequence of actions performed by the robotic creature outputs (e.g. head mechanism, eyelid mechanism, lights, speakers, and/or drivetrain), but can alternatively be any other suitable set of actions performed by any other suitable system (e.g., robotic creature of otherwise). Preferably, S260 is performed after S250, but can additionally or alternatively be performed in the absence of an event associated with a technological imperfection, throughout a robot action, multiple times throughout the method (e.g. continuously), routinely (e.g. to update the robotic creature's internal map), or at any other time.

Each action in the sequence is preferably associated with a set of action parameter values defining different parameters of the performed action. The action parameters can include: operated subcomponent (e.g., rangefinding system, camera system, head motor, drivetrain, etc.), subcomponent operation parameters (e.g., power provision, frequency, duration, speed, timing, etc.), action duration, action intensity (e.g., output amplitude or magnitude), or any other suitable set of parameters. For example, a "scanning" data-acquiring action can include a sequence of side-to-side and top-to-bottom head actuations to mimic scanning across and up-and-down a room, respectively. In this example, the action parameters for each head actuation include: the distance the head is actuated, the direction the head is actuated, the speed of head actuation, and the time duration separating successive head actuation actions. In one variation, the data-acquiring action and its action parameter values are chosen to prompt a user to provide additional information. For example, a "quizzical" data-acquiring action can include a vocal output to mimic the high-rise-terminal (e.g. uptalk) structure of a question, which prompts a user to repeat or rephrase their original command. In this example, the action parameters for each vocal output include the duration of the vocal output and its pitch progression (e.g. rising pitch intonation). However, the data-acquiring actions can be otherwise characterized.

The performed data-acquiring action (including the sequence of actions and the action parameters for each action within the subset) is preferably pre-associated with the detected event (e.g., technological imperfection), but all or part of the data-acquiring action can alternatively or additionally be determined: using a state machine (e.g., based on context and robotic creature mood), using an artificial intelligence module (e.g., classification, regression, etc.), selected (e.g., based on operation context, sampled information), randomly, user-determined, or otherwise determined. The performed data-acquiring action is preferably automatically determined by the robotic creature (e.g., retrieved from on-board memory, using an on-board adjustment module, etc.), but can additionally or alternatively be entirely or partially determined by a remote computing system (e.g., server), user device (e.g., connected smartphone or tablet), or by any other suitable computing system. In the latter instances, event-to-data-acquiring action maps can be periodically received by the robotic creature from the external system, the data-acquiring action can be retrieved by the robotic creature from the external system based on the detected event, the event or parameters thereof (e.g., underlying sensor measurements) can be sent to the external system and the data-acquiring action received, or the data-acquiring action otherwise determined. The data-acquiring action can be associated with a set of technical requirements, which can include a minimum, maximum, preferred range, or other measure of performance time, motion or actuation pattern (e.g., moving the data-acquiring component along a predetermined trajectory, etc.), power draw, or any other suitable technical requirement.

Automatically performing a set of expressive actions S270 associated with the event functions to reduce negative user responses to the robotic creature's technological imperfections. Additionally or alternatively, S270 can function to distract a user while the robotic creature is performing a data-acquiring action, prevent a user from becoming angry that the robotic creature has experienced a technological imperfection (e.g. reduce the likelihood of receiving a user input with a low positivity score), or any other function. The expressive action preferably includes a predetermined sequence of actions performed by the robotic creature outputs (e.g., head mechanism, eyelid mechanism, lights, speakers, and/or drivetrain), but can alternatively be any other suitable set of actions performed by any other suitable system (e.g., robotic creature or otherwise). Each action in the sequence is preferably associated with a set of action parameter values defining different parameters of the performed action. For example, for a "tired" expressive action can include a sequence of successive eyelid lowering and raising by the eyelid mechanism (e.g., simulating a blink), wherein each successive blink is lower and slower than the previous. In this example, the action parameters for each eyelid actuation include: the distance the eyelid is actuated, the speed of eyelid actuation, and the time duration separating successive eyelid actuation actions. However, the expressive actions can be otherwise characterized. Preferably, the expressive action's action parameters (and/or instructions) are determined based on the technical requirements of the data-acquiring action (e.g. the values of the expressive action are determined based on the action parameter values of a data-acquiring action), but can be manually determined, empirically determined (e.g., increased if the data-acquiring action did not have sufficient time to adequately sample data for technological imperfection resolution), or otherwise determined. For example, the expressive action parameters can be selected such that the data-acquiring action has sufficient time and/or data points to resolve the technological imperfection. In a specific example, the expressive action animation duration can be substantially equal to (e.g., within 1 s, 5 s, 10%, etc.), longer than, or shorter than the data-acquiring action. In a second specific example, the expressive action can move the data-acquiring component (e.g., camera, rangefinding system) along a data-acquisition trajectory. However, the expressive action parameters can be otherwise determined.

The expressive action can be performed concurrently, asynchronously (e.g., before, after), or at any suitable time relative to the data-acquisition action. Alternatively or additionally, the expressive action can function as the data-acquisition action. In a first example, one or more of the duration, speed, frequency, timing, and any other parameter of the expressive action can be chosen to ensure that the expressive action and the data-acquiring action occur partly or completely concurrently. In this example, the expressive action can function to distract the user from the data-acquiring action. In another example, the expressive action is chosen to be performed with the same mechanism (e.g. head mechanism) as the data-acquiring action. Alternatively, the action parameter values of the expressive action can be predetermined, specified by an authorized user, or determined in any other way.

The performed expressive action (including the sequence of actions and the action parameters for each action within the subset) is preferably pre-associated with the detected event, but all or part of the expressive action can alternatively or additionally be determined: using a state machine (e.g., based on context and robotic creature mood), using an artificial intelligence module (e.g., classification, regression, etc.), randomly, user-determined, or otherwise determined. The performed expressive action is preferably automatically determined by the robotic creature (e.g., retrieved from on-board memory, using an on-board adjustment module, etc.), but can additionally or alternatively be entirely or partially determined by a remote computing system (e.g., server), user device (e.g., connected smartphone or tablet), or by any other suitable computing system. In the latter instances, event-to-expressive action maps can be periodically received by the robotic creature from the external system, the expressive action can be retrieved by the robotic creature from the external system based on the detected event, the event or parameters thereof (e.g., underlying sensor measurements) can be sent to the external system and the expressive action received, or the expressive action otherwise determined.

In one variation, the determined event is associated with a predetermined sequence of actions, each with a set of baseline action parameter values, wherein the action parameter values are dynamically adjusted based on the robotic creature mood and/or instantaneous operation context. Dynamically adjusting the action parameter values can include: scaling the values as a function of the mood and/or context; selecting a new equation to determine the action parameter values based on the mood and/or context; or otherwise adjusting the action parameter values. The action parameter value adjustment can be learned, changed over time according to a predetermined pattern, or otherwise determined.

In one variation, the data-acquiring action is an expressive action. For example, a sequence of head actuations to mimic scanning a room may function to gather information to compare with an internal map (data-acquiring action), allow sufficient time for a rangefinding system to sample the ambient environment and/or localize the robot within an internal map (data-acquiring action), and/or look pleasing to a user and convey that the robotic creature looks lost (expressive action). This animation can optionally include a second stage, which includes a sequence of body actuations to mimic scanning a room (e.g., turning the body side to side), which can allow the rangefinding system to sample a larger field of view and gather more information for robotic creature localization. The second stage can automatically follow the first stage, be concurrently performed with the first stage, be triggered when data gathered during the first stage is insufficient to localize the robot (e.g., within a predetermined certainty threshold). In a second variation, the expressive action is a data-acquiring action. For example, a vocal output with rising pitch intonation of the robotic creature may be comical to a user (expressive action), while prompting a user to repeat a command (data-acquiring action).

The robotic creature mood can be determined based on historic user interaction with the robotic creature (e.g., happiness increased as a function of positive interactions, such as petting and detection of users smiling, degraded as a function of negative interactions, such as pushing the robotic creature over or detection of users yelling at the robotic creature, degraded as a function of time away from a given user, determined based on positivity scores), successful completion of assigned tasks by the robotic creature (e.g., happiness augmented upon successful completion and degraded upon failure), a baseline mood (e.g., happy), or otherwise determined. The baseline robotic creature mood can optionally be recovered at a predetermined rate (e.g., a happy robotic creature will react less happily over time, unless positive interactions are received in the interim).

The robotic creature context can be determined based on: obstacles within the proximal environment (e.g., presence of objects, object classes, etc.), sounds recorded by the acoustic sensors (e.g., classification of the sounds as happy or angry, loud or soft, etc.), facial expressions of users proximal the robotic creature (e.g., classification of expressions as happy, curious, sad, angry, etc.), presence of users within the robotic creature environment (e.g., determined based on whether the associated user device is connected to a shared communications network, determined from security camera measurements, etc.), events in the associated user's calendars, recent social networking posts by an associated user, or any other suitable parameter indicative of the operating context for the robotic creature.

In one example, dynamically adjusting the parameter values based on the robotic creature mood includes: when the robotic creature mood is happy (e.g., as determined from a high robotic creature happiness score), increasing the acoustic frequency of the emitted sounds, increasing the brightness of the chest light, and increasing the duration of expressive action playback. When the robotic creature is sad (e.g., as determined from a low happiness score), decreasing the acoustic frequency of emitted sounds, decreasing the chest light brightness, and slowing the expressive action playback. However, the parameter values can be otherwise adjusted.

The method can additionally include performing an action based on information determined during the data-acquiring action S280. Preferably, the action is the action that the robotic creature is initially commanded to perform (the action interrupted by the event, such as a failure event, associated with a technological imperfection). Alternatively, the action can be a modified version of the original action (e.g. when the robotic creature cannot overcome the event associated with a technological imperfection), or any other suitable action. The different action can be selected form a set of predetermined related actions, be randomly selected, or be any other suitable action. The action is preferably performed after performance of a data-acquiring action and an expressive action, but can alternatively be performed after one of a data-acquiring action and an expressive action, in the absence of an expressive action, multiple times throughout the method, or at any other time. The action is preferably performed with information determined during the data-acquiring action, but can additionally or alternatively be performed with information determined during an expressive action. In one variation, the action is movement toward a specified room in a house and the information determined during the data-acquiring action is the location of the robotic creature with reference to its internal map. In another variation, the action is playing a specific song through the robotic creature's speaker and the information determined during the data-acquiring action is the song title.

As shown in FIG. 13, a first example of the method includes: detecting unexpected robot contact with an obstacle and performing an expressive action including: playing an "ooh!" sound within a predetermined time duration (e.g., 1 s) after obstacle contact, determining the direction of the obstacle relative to the robotic creature, actuating the head such that the eyes are directed in the determined direction for a predetermined period of time (e.g., 3 s), actuating the head and/or drivetrain such that the eyes are directed in a second direction different from the determined direction (e.g., opposite direction), and actuating the drive train to translate the robot in the second direction. The robot can optionally reverse (e.g., back up) or move in a direction opposing the detected object prior to translating in the second direction.

Figure 14:
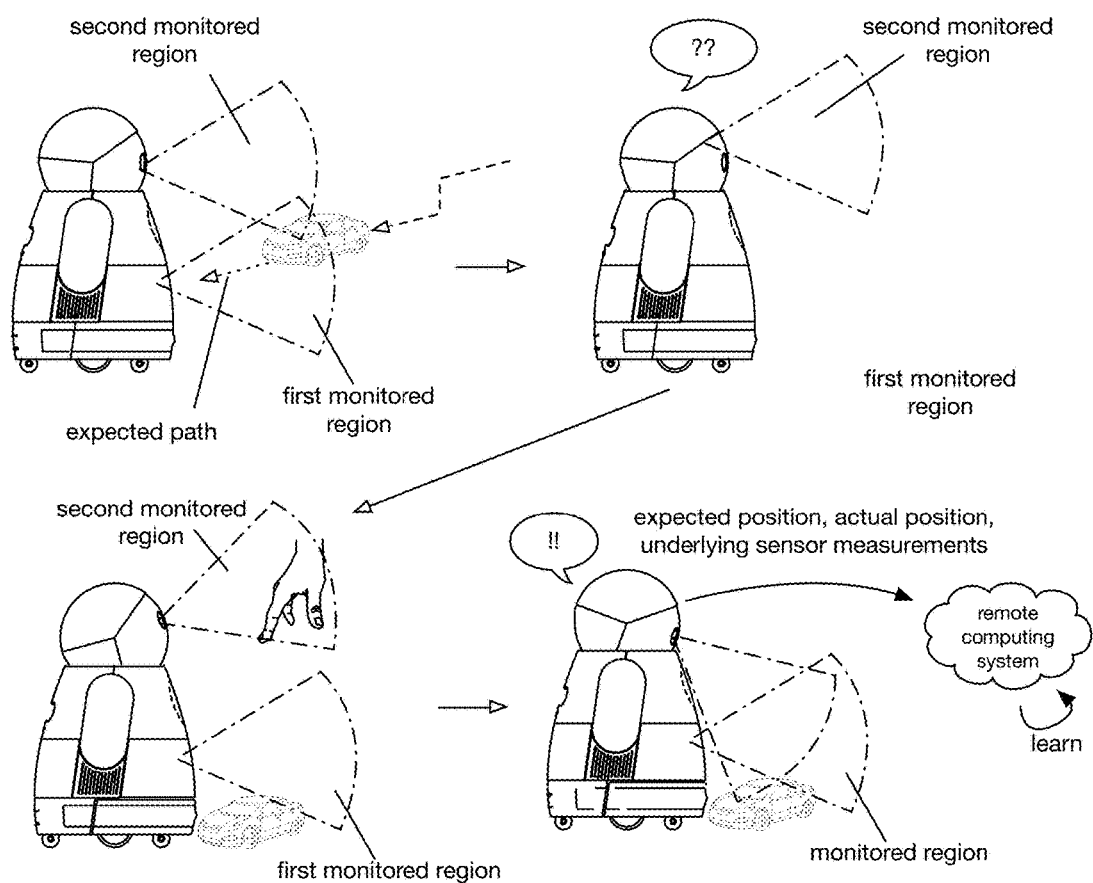

As shown in FIG. 14, a second example of the method includes: detecting unexpected obstacle movement, determining that a user command failed (e.g., the NLP module failed to return a recognized command), or determining that the robotic creature is stuck (e.g., based on the wheel encoders); and performing an expressive action including: playing a confused sound, optionally panning the head, identifying a user proximal the robotic creature, actuating the head to direct the eyes toward the identified user (e.g., by tilting the head upwards), and, learning based on the user response. In a specific example, this includes detecting unexpected child movement in response to detection of a child moving in a first direction in a first video frame, and determining that the child is not in an expected location in a second video frame, wherein the expected location is determined based on the first direction; playing the confused sound; looking at a nearby adult; receiving a user indication of where the child is (e.g., extracting the direction the adult's pointed finger); actuating the head mechanism and/or drivetrain to turn toward the child's indicated position; recording parameters of the actual child's position; and training the object tracking modules based on the measurements underlying the actual child's position and expected child position.

A third example of the method includes: detecting a region of the ambient environment with intense sunlight (e.g., which can wash out the rangefinder signal), and performing an expressive action including: playing a scared sound (e.g., "whoa!") and actuating the drive train to turn and drive the robotic creature away from the sunlight. The expressive action can optionally include: actuating the eyelid mechanism to lower the upper eyelids and actuating the head mechanism to lower the head.

Figure 11:
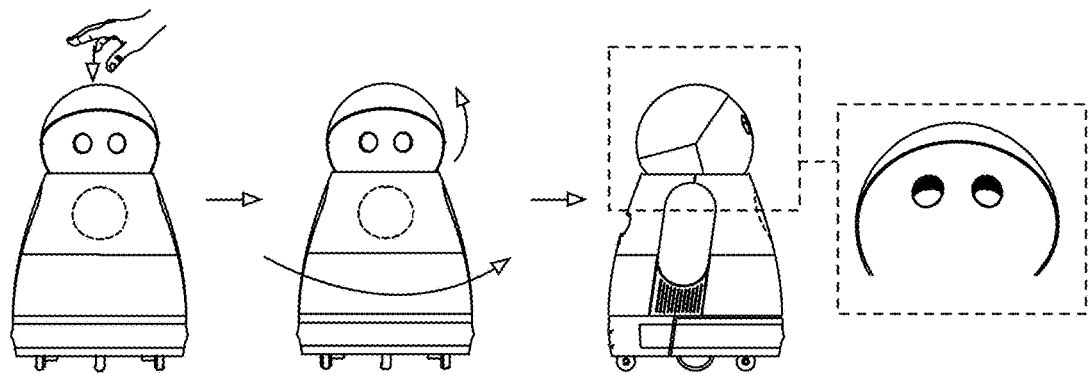
FIGS. 11-16 are schematic representations of examples of the method.
Figure 12:
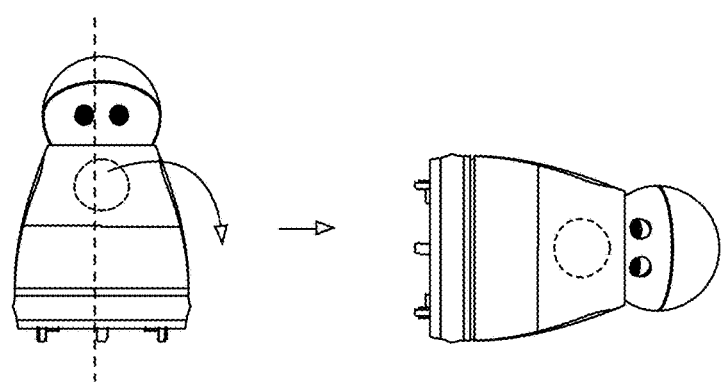

As shown in FIG. 12, a fourth example of the method includes: detecting robotic creature tilt beyond a threshold angle from vertical (e.g., using the gyroscope) and performing a "sad" action including: tilting the head downward, playing a sad sound, and actuating the eyelid mechanism to lower the eyelid (e.g., upper eyelid). A fifth example of the method includes: detecting a happy event (e.g., successful mission completion, detection of a head part from the head touch sensors as shown in FIG. 11, detecting a "thank you" from a user, detecting a user associated with the robotic creature, etc.) and performing a "happy" action including: tilting the head up and actuating the eyelid mechanism to raise the lower eyelids. The method can optionally include: pausing a predetermined time period (e.g., 1s) after touch detection before performing the expressive action, blinking or pulsing the chest light, or performing any other suitable output. A sixth example includes: determining that the robot SOC is below a threshold level and performing a "tired" expressive action. However, any other suitable expressive action can be performed in response to determination of any other suitable event.

Figure 15:
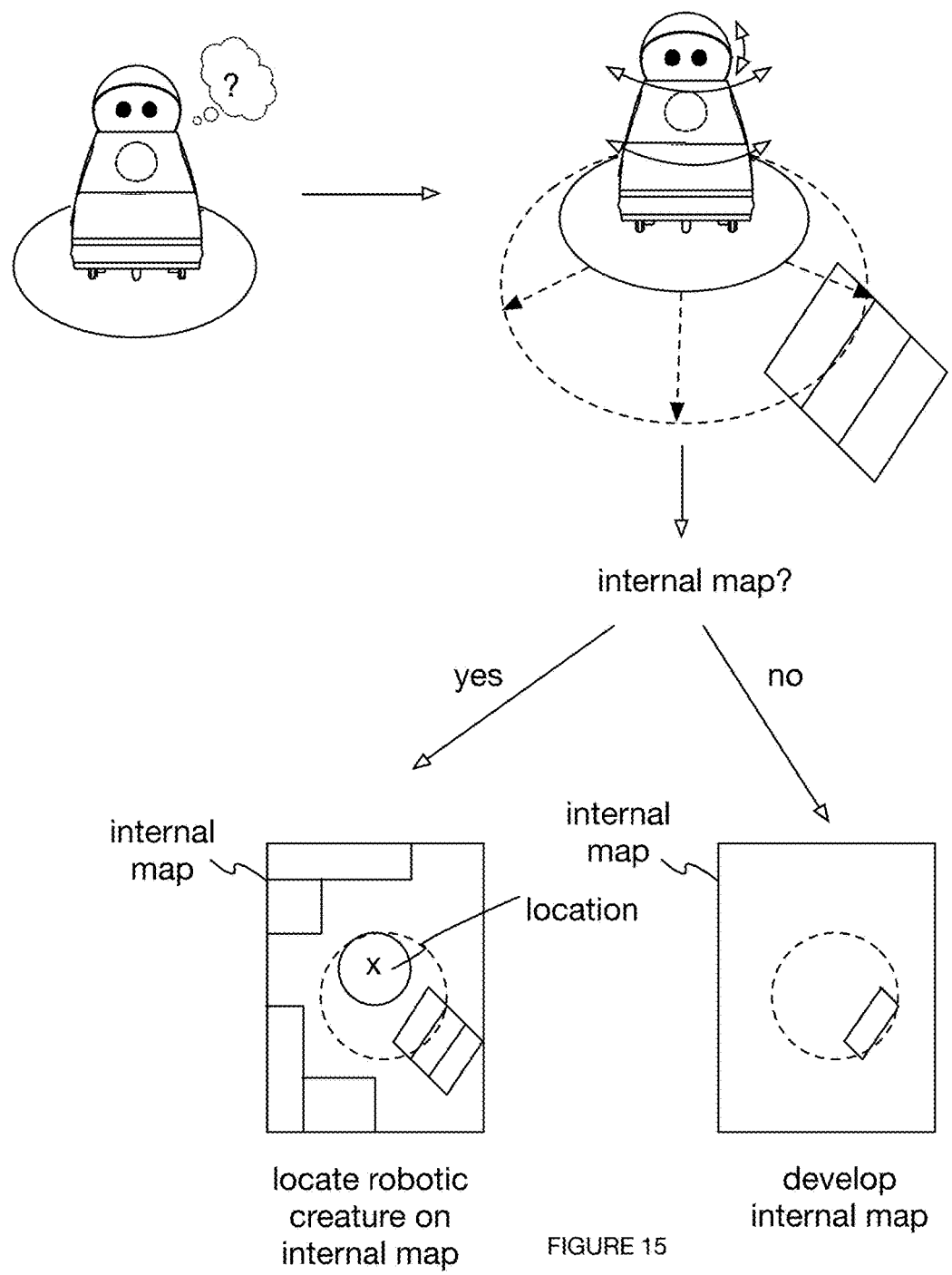

As shown in FIG. 15, a seventh example of the method includes detecting the event of being 'lost', wherein the robotic creature is unfamiliar with its surroundings. The robotic creature can perform one or more data-acquiring actions, such as: a side-to-side head actuation, an up-and-down head actuation, and/or a side-to-side drivetrain actuation, which can function to increase the field of view and/or depth of the robotic creature's camera or another sensor (e.g. depth sensor); reducing the robotic creature driving speed; or any other suitable action. These actions can also serve as expressive actions, or a different expressive action (e.g. playing a 'confused' sound through a speaker) can be performed concurrently with the data-acquiring actions. If the robotic creature has an existing internal map, the information determined from the data-acquiring action can help establish a match of the robotic creature's current location with the internal map, thereby locating the robotic creature. If the robotic creature does not yet have an internal map (e.g. during setup), the data-acquiring actions can function to start developing the internal map.

Figure 16:
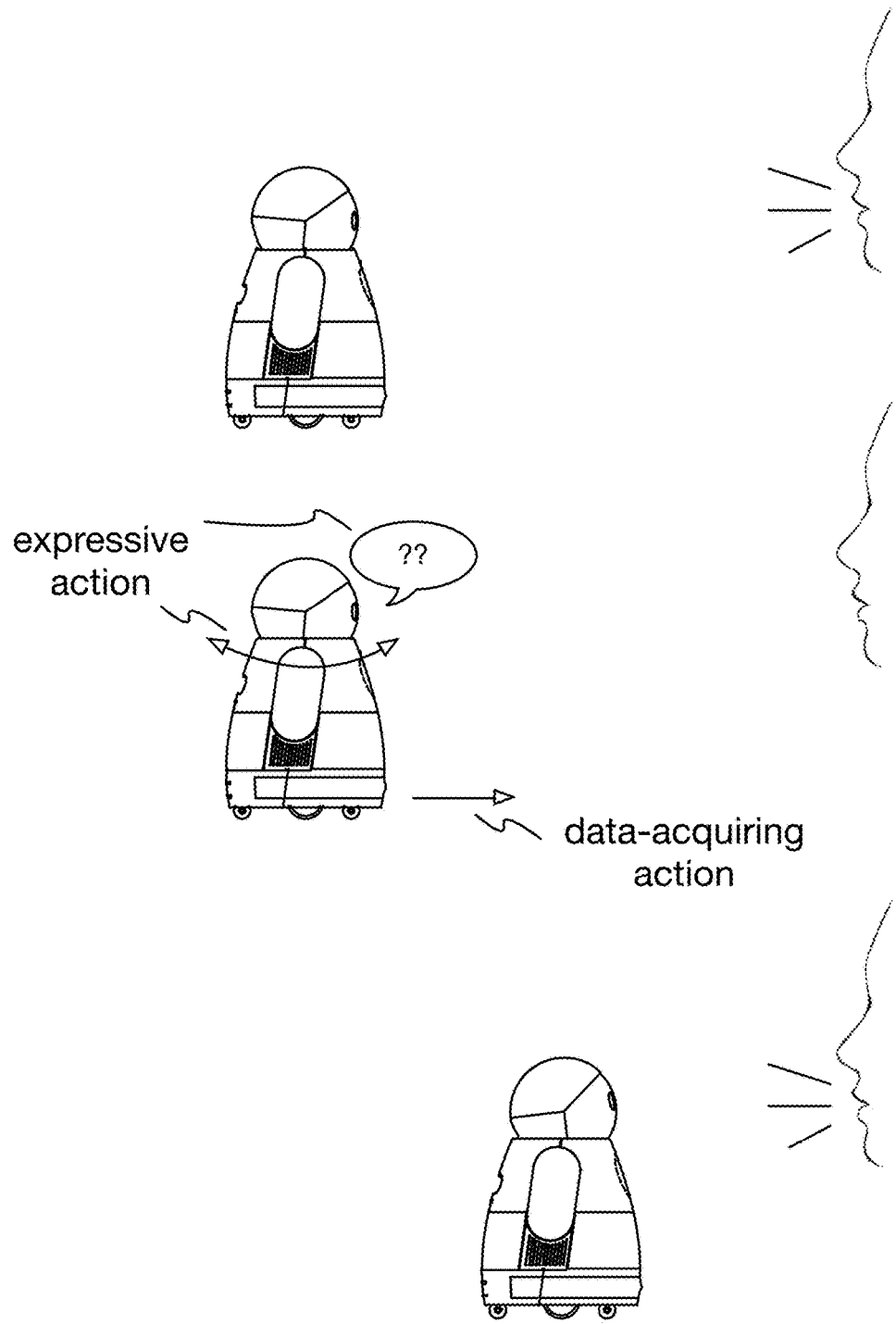

As shown in FIG. 16, an eighth example of the method includes detecting the event of receiving an unrecognized voice command, such as a voice command that is not detectable, a voice command below a volume threshold, or a voice command not present in a library of known voice commands. In this example, the robotic creature can perform an expressive action, such as a series of head actuations to mimic a confused head shake and/or playing a 'confused' sound through a speaker. The robotic creature can also perform a data-acquiring action, such as moving closer to the user, which prompts the user to repeat or rephrase the voice command.

Embodiments of the system and/or method can include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for responding to a technological imperfection associated with a task of a robot, comprising:
   receiving a command to perform a first action;
   sampling sensor signals associated with the first action from a sensor;
   attempting performance of the first action based on the sensor signals;
   in response to failure to perform the first action:
      performing a data-acquiring action associated with the failure, comprising sampling auxiliary signals with an on-board sensor;
      performing an expressive action, associated with the failure, according to instructions determined based on a technical requirement of the data-acquiring action; and
      performing the first action, wherein the first action is performed based on the auxiliary signals.

2. The method of claim 1, wherein:
   the sensor comprises an audio sensor;
   failure to perform the first action comprises receiving a voice command omitted from a library of known commands;
   the expressive action comprises a head actuation; and
   the data-acquiring action comprises movement toward a user.

3. The method of claim 2, wherein the head actuation comprises a side-to-side movement performed at a predetermined frequency.

4. The method of claim 1, wherein:
   the sensor comprises a location sensor;
   failure to perform the first action comprises detecting a delocalization event;
   the data-acquiring action comprises sampling a feature of an ambient environment using an on-board mapping system over a predetermined time period; and
   the expressive action comprises a head actuation animation having a duration substantially equal to the predetermined time period.

5. The method of claim 4, wherein detecting the delocalization event comprises detecting a pickup event, comprising detecting wheel unloading and re-loading.

6. The method of claim 1, wherein:
   the sensor comprises a contact sensor arranged in a front bumper of the robot;
   the first action comprises traversal along a navigation route, wherein failure to perform the first action comprises detecting a collision between the front bumper and an external obstacle;
   the expressive action comprises a head actuation downward toward the obstacle; and
   the data-acquiring action comprises movement away from the obstacle.

7. The method of claim 6, wherein the front bumper is mounted to the robot at a predetermined height relative to the ground.

8. The method of claim 6, further comprising:
   concurrently sampling an image of the external obstacle with a camera arranged within the head while the head is actuated downward; and
   determining an obstacle dimension based on the image;
   wherein performing the first action based on the auxiliary signals comprises:
      generating a second navigation route based on the navigation route and the obstacle dimension; and
      controlling the robot to traverse along the second navigation route.

9. The method of claim 1, wherein the data-acquiring action and the expressive action are performed concurrently.

10. The method of claim 1, wherein the expressive action comprises a string of non-verbal sounds.

11. The method of claim 10, wherein the robot determines a pitch of the non-verbal sounds based on the failure to perform the first action, wherein the robot subsequently plays the non-verbal sounds with said pitch to a user.

12. The method of claim 1, further comprising:
   receiving a user input, wherein the user input is assigned a positivity score based on a predetermined positivity scale;
   determining a robot mood score based on the positivity score; and
   performing the first action based on the robot mood score, wherein the first action is associated with a set of operation parameters, wherein a magnitude of an operation parameter within the set of operation parameters is determined based on the robot mood score.

13. The method of claim 12, wherein the robot mood score degrades with time.

14. The method of claim 13, wherein the user input comprises a touch received by a capacitive touch sensor on a head of the robot.

15. The method of claim 14, further comprising identifying a specific user, wherein the robot mood score is further determined based on a history of user interactions associated with the specific user.

\* \* \* \* \*